US008949052B2

(12) United States Patent
Chakradhar

(10) Patent No.: US 8,949,052 B2
(45) Date of Patent: Feb. 3, 2015

(54) METHOD TO DETERMINE UTILITY CONSUMPTION OF INDIVIDUAL APPLIANCES IN A HOUSEHOLD FROM PERIODIC MEASUREMENTS OF AGGREGATE UTILITY CONSUMPTION

(76) Inventor: Vineel Chakradhar, Lincroft, NJ (US)

( * ) Notice: Subject to any disclaimer, the term of this patent is extended or adjusted under 35 U.S.C. 154(b) by 478 days.

(21) Appl. No.: 13/274,564

(22) Filed: Oct. 17, 2011

(65) Prior Publication Data
US 2013/0096857 A1    Apr. 18, 2013

(51) Int. Cl.
*G01D 4/00*    (2006.01)
(52) U.S. Cl.
CPC .............. *G01D 4/002* (2013.01); *Y02B 70/3266* (2013.01); *Y02B 90/241* (2013.01); *Y04S 20/242* (2013.01); *Y04S 20/32* (2013.01); *Y04S 20/38* (2013.01)
USPC .......................................................... 702/61
(58) Field of Classification Search
CPC .................................................... G01D 4/002
USPC .......................................................... 702/61
See application file for complete search history.

(56) References Cited

U.S. PATENT DOCUMENTS

| 7,502,698 B2 * | 3/2009 | Uenou et al. ..................... 702/60 |
| 2011/0125337 A1* | 5/2011 | Zavadsky et al. ............ 700/291 |
| 2013/0238266 A1* | 9/2013 | Savvides et al. ................ 702/61 |

* cited by examiner

*Primary Examiner* — Bryan Bui
(74) *Attorney, Agent, or Firm* — Sughrue Mion, PLLC

(57) ABSTRACT

A method of determining the utility consumption of each appliance in a collection of appliances by using periodic measurements of aggregate utility consumption of all appliances in the collection, is disclosed. The method comprises of determining the normal utility consumption of various modes of each appliance, fixing a measurement interval, and then measuring aggregate utility consumption at periodic intervals. In each interval, we first determine if the change in aggregate utility consumption in an interval is due to change in status (ON or OFF) of one of the appliances. Otherwise we determine if the change in aggregate consumption is due to a change in status of a pair of appliances. Otherwise, we determine if change in aggregate consumption is due to change in status of a triplet of appliances.

16 Claims, 8 Drawing Sheets

METHOD TO DETERMINE UTILITY CONSUMPTION OF INDIVIDUAL APPLIANCES IN A HOUSEHOLD FROM PERIODIC MEASUREMENTS OF AGGREGATE UTILITY CONSUMPTION

BACKGROUND

1. Technical Field

This invention relates to the measurement of utility (electricity, gas etc.) consumption by individual appliances in homes and buildings by only observing the aggregate utility consumption of all appliances.

REFERENCES

[1] Smart meters, http://en.wikipedia.org/wiki/Smart_meter
[2] Google power meter http://www.google.com/powermeter/about/
[3] Microsoft Hohm http://www.microsoft-hohm.com/
[4] Watts up? https://www.wattsupmeters.com/secure/index.php
[5] Electricity meters http://en.wikipedia.org/wiki/Electricity_meter
[6] Energy usage of household appliances http://www.energysavers.gov/your_home/appliances/index.cfm/mytopic=10040
[7] Appliance energy usage http://www.otpco.com/SaveEnergyMoney/applianceEnergyUsage.asp
[8] Typical power consumption of appliances http://www.oksolar.com/technical/consumption.html
[9] Consumer energy center http://www.consumerenergycenter.org/home/appliances/small_appl.html
[10] Thermal imaging of residences http://www.massinfrared.com/

2. Description of the Related Art

There has been no easy way of knowing how much utility is consumed by each appliance in a household over a period of time (week, month, year etc.). Consequently, most home owners do not know what adjustments, if any, they have to make to modify their utility consumption. For example, the utility company sends a bill every month for the total electricity consumed by a household, but the utility company does not provide the homeowner with a breakdown of electricity usage by various appliances in the household. There may be several appliances in the household that use gas for their operation, but the gas company also only reports the total (aggregate) gas consumption every month.

We briefly review the state of art in measuring the consumption of an important utility, namely electricity [1, 2, 3, 4, 5].

Smart Meters are advanced meters that record consumption of electricity (or other utilities) in intervals of an hour or less and communicate that information at least once a day via some communications network back to the utility provider for monitoring and billing purposes. They provide real-time information on electricity consumption, and are generally employed by utility companies.

Google PowerMeter is a software application that allows electricity consumers to record the user's electricity usage in near real-time. PowerMeter is intended for use with a smart meter.

Microsoft Hohm is an online web application by Microsoft that enables consumers to analyze their energy usage and it provides energy saving recommendations. Consumers can log into the Hohm site, and start off by entering just their Windows Live ID and their zip code. Using this simple location information Hohm uses algorithms licensed from Lawrence Berkeley National Laboratory and the Department of Energy to start predicting home energy consumption. Users are encouraged to enter as much info as they want (answering up to 180 questions) about home size, water heater brand, etc., to make the energy prediction of their home as accurate as possible.

Watts Up? is a power analyzer and data logger. It is used on the lab bench by major companies like Dell, EPRI, GM, Honeywell, and Cisco. Watts up? meters have a variety of uses (Disaster Recovery, IT, Landlords, Inspectors, Electricians, Service Repair, Manufacturers). It can also calculate and analyze the energy consumption of a single appliance for a given period of time.

Thermal imaging of the entire home is another technique to identify energy leaks in a home [10]. This is not a measurement technique, but such imaging is useful in reducing the energy consumption by eliminating energy leaks.

Our invention applies to any utility that is consumed by appliances. For ease of understanding, we limit the discussion to consumption of electricity by appliances in a household.

None of the schemes described above for measuring electricity consumption can figure out the individual breakdown of consumption by each appliance in a household, over a period of time. An obvious solution is to attach a utility meter to each appliance in the household to record utility usage. However, this is an expensive solution, and it may also be impractical to retrofit a household with such utility meters, especially for measuring utility consumption of HVAC system, or central vacuum cleaners, ceiling fans or lights etc.

SUMMARY

As our invention, we propose a new method to determine the individual utility consumption of each appliance in a household, over a period of time, by measuring only the aggregate utility consumption of all appliances in the household. Our method can be used to monitor electricity, gas or other utility consumption in a household or building.

Knowing the utility consumption of every appliance in a household is extremely useful. Such information can help determine usage patterns of appliances that can result in meaningful reduction in the total utility cost for a household. A breakdown of utility usage will also reveal mal-functioning or failed appliances.

Since a utility company is already aware of aggregate utility consumption of a household every month, and using our invention, it would be logical to expect the utility company to provide the customer with the breakdown of utility consumption. However, as our invention discloses, it will be necessary for the utility company to know more information about the various appliances in the household, as well as install equipment to measure aggregate utility consumption of a household at fine-grained intervals like every few seconds or minutes. It is likely that home owners may not provide such information to the utility company. Home owners value their privacy, and they may not want to reveal what appliances are there in a household. Such information can provide the utility company with valuable insights into the lifestyle and appliance preferences of a home owner, and possibly lead to adverse uses. It is possible to conclude many other things by knowing the activity pattern of appliances in a household. For example, burglars can interpret a lack of appliance activity as the family having gone on vacation.

We envision the use of our invention by homeowners who are eager to lower their utility consumption by monitoring, measuring and controlling the utility consumption of each appliance in the household. Since our invention is intended for use in a household, another feature of our invention is that it is a very low-cost solution. Electricity measurement units used in our invention cost less than $100, and any computer in the household can be used to analyze the measurement data to determine the breakdown of electricity consumption.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

Figure 1:
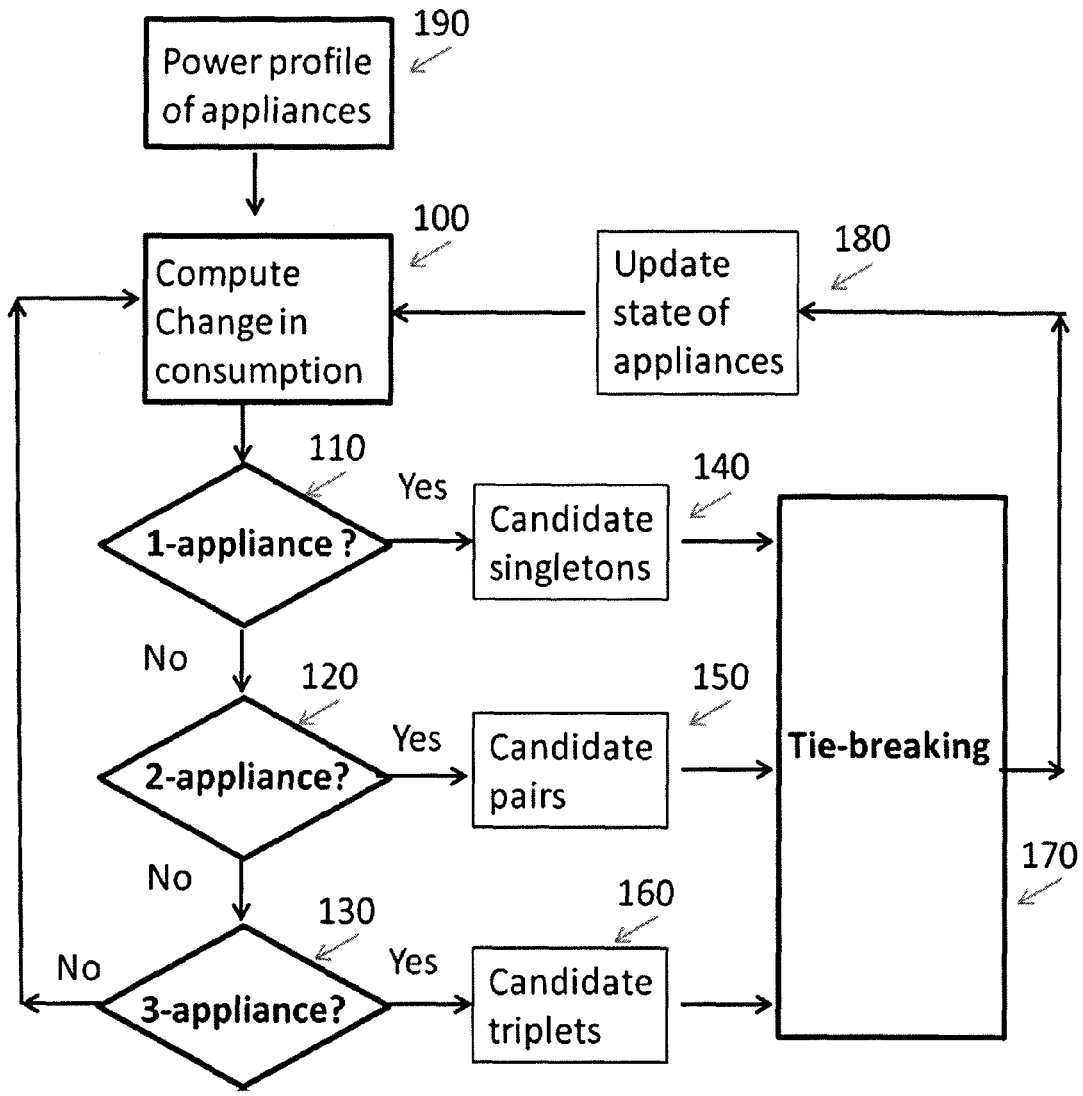
FIG. 1 shows the overall block diagram of the proposed process to determine individual appliance power consumption from periodic, aggregate power consumption measurements.

TABLE 1 lists power consumption profiles of common household devices.

TABLE 2 lists power modes of some household appliances.

DETAILED DESCRIPTION OF PREFERRED EMBODIMENTS

Characteristics of Household Appliances:

We briefly review the important characteristics of household appliances that consume electricity. Similar analysis is also possible for appliances that consume other utilities (gas etc.). Power consumption profile of appliances in a household can vary widely. Resistive loads require the same amount of power to both start and run the equipment. Many resistive loads are involved in heating or making heat of some kind. Examples of resistive loads include: light bulbs, coffee maker, toaster, computers, etc. Reactive loads contain an electric motor, and the motor requires additional power to start. However, the motor requires significantly less power to run, after the motor has started. Typically starting power is 2 to 3 times the amount of power required to run the appliance. Examples of reactive loads include: refrigerators/freezers, furnace fans, well pumps, air conditioners, grinders, compressors, power tools, washing machines, dishwashers, garage door openers, sump pumps, well pumps etc. Some household appliances, like a furnace or refrigerator, have internal fans that come on intermittently. Extra wattage/power is needed to start the fan each time. Refrigerators also have a defrost cycle that requires power in addition to the compressor and fans. Reactive loads may also require additional power when the electric motor begins to work. For example, when a saw begins cutting wood, its power requirement will increase (such power is referred to as the loaded power consumption). This is not applicable for most household appliances.

Most household appliances also support different modes of usage. For example, a bread toaster with dual toasting slots will consume twice as much power when both the slots are used, as compared with the case where only one toasting slot is being used. As another example, consider the Microwave Oven. Opening the door of the microwave causes a 20-watts bulb to turn on. A typical microwave supports multiple power modes, and depending on the mode, the power consumption can be as high as 1800 watts. Power consumption during different modes of usage of an appliance can vary dramatically. A popular mode for many household appliances is the "stand-by" mode. Standby power is electricity used by appliances while they are switched off or not performing their primary function. Standby power is consumed by power supplies, the circuits and sensors needed to receive a remote signal, soft keypads and displays including LED status lights. In some cases, standby power consumption is unavoidable. Certain appliance functions do require small amounts of electricity: maintaining signal reception capability (for remote control, telephone or network signal), monitoring temperature or other conditions (such as in a refrigerator), powering an internal clock, battery charging, continuous display etc. Stand-by power consumption can be less than a watt, and in some cases it can be as large as 10 watts.

Table 1 [6, 7, 8, 9] shows examples of popular household appliance, and their category (being resistive or reactive loads). It also identifies the starting and running power consumption of these appliances. Table 2 shows some of the power modes of household appliances.

We can either use a catalog of popular household appliances and their power consumption modes or calibrate appliances in a household. Calibration can be done in many ways, and we describe our preferred method. We measure the power consumption at the main electricity line entering the house while appliances in the house are turned on and off, one at a time, in a controlled manner. The total increase in aggregate power consumption when an appliance is turned on is then attributed to that appliance. We can repeat this process for each mode of an appliance. For the purpose of this invention, we consider each mode of operation of an appliance as a separate, new appliance.

Figure 7:
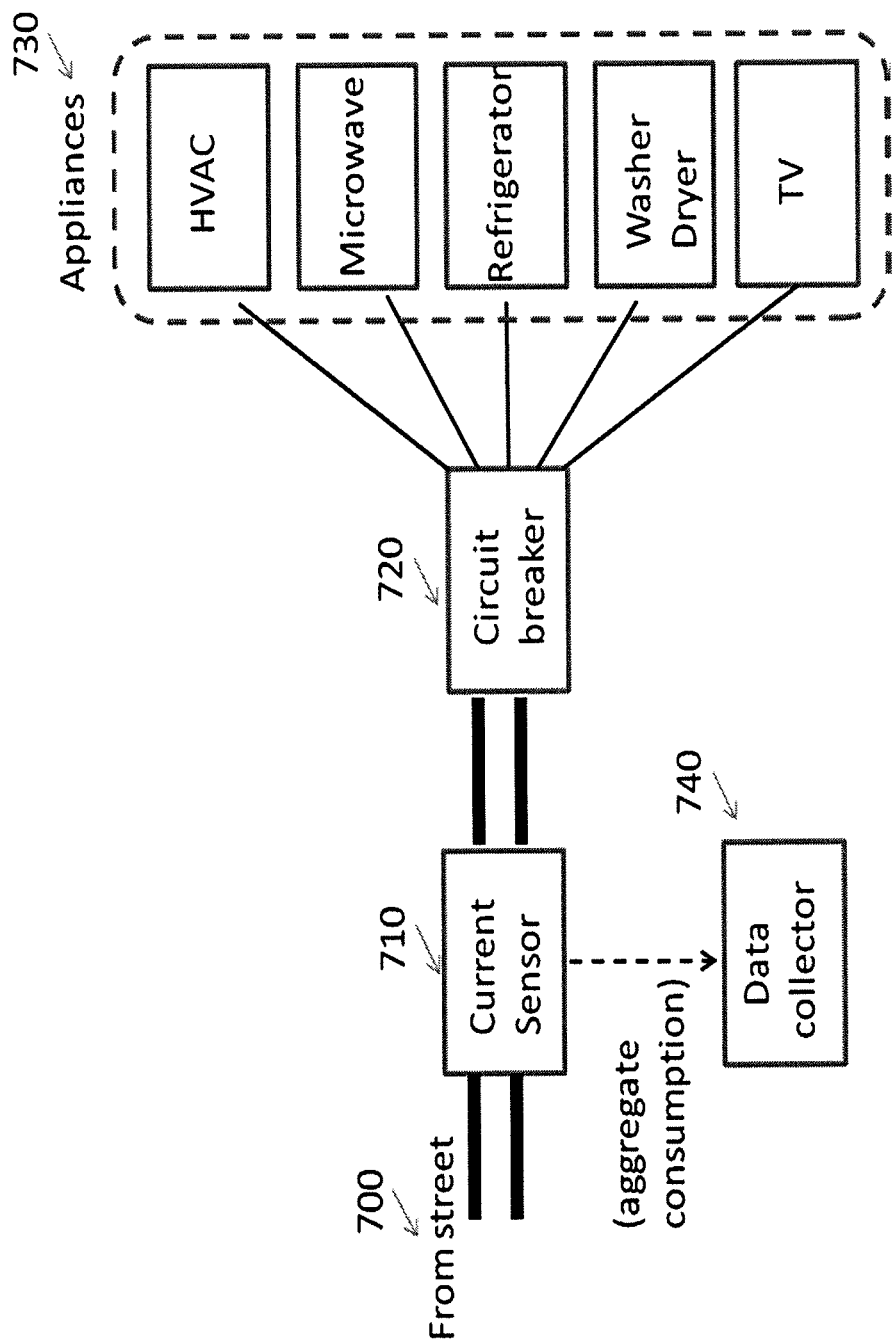
FIG. 7 shows the overall data collection and measurement set-up for a household.

Measurement Set-Up for a Household:

As shown in FIG. 7, we connect a low-cost current meter 710 to the electricity cables that are brought into the household by the utility company, from outside the household (shown in the figure as "from street" 700). These cables are connected to the main circuit breaker 720 in a household. The current meter 710 consists of two toroidal rings that can be clamped around the two main power cables that come into the main circuit breaker. The current meter 710 measures the current flowing through the power cables at periodic intervals, and it converts the current consumption into power consumption readings. The current meter also has wireless network connectivity to periodically transmit the power measurement readings to an external device like a computer 740. Analysis of the periodic, aggregate power consumption measurements from the current meter can be performed either on the computer or these measurements can be transmitted over a network to remote web-sites or other computers.

Figure 8:
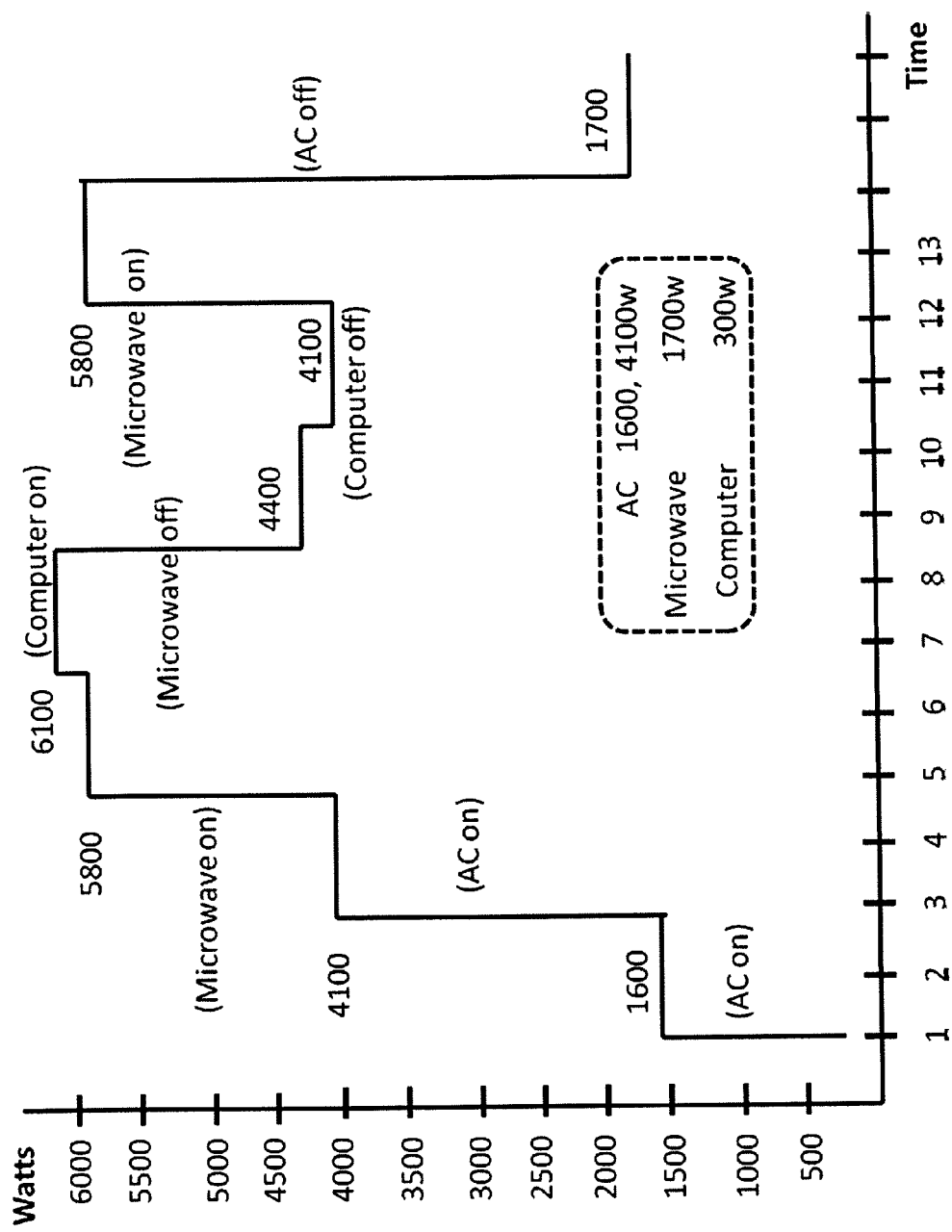
FIG. 8 shows an example of how aggregate measurement data can be used to determine power consumption of individual appliances.

Example of Aggregate Consumption and Breakdown:

FIG. 8 shows a plot of the periodic measurements from a current meter over time. The Y-axis shows aggregate power consumption measurements (in watts), and the X-axis shows the measurement intervals. In this example, we assume that the household has only three appliances: an Air-conditioner that consumes 1600 watts of starting power, and 4100 watts of running power, a Microwave that consumes 1700 watts of resistive power, and a Computer that consumes 300 watts of resistive power. Consider the graph in FIG. 8. It shows that the aggregate power consumption during the first measurement interval (x-axis label is 1) was 0. During the second measurement interval (x-axis label is 2), the aggregate power consumption has increased to 1600 watts. This increase of 1600 watts in aggregate consumption is due to the Air Conditioner (AC) turning on (i.e. changing state from the OFF state to the ON state). During the fourth measurement interval (x-axis label is 4), aggregate consumption has increased to 4100 watts. This increase of 2500 watts is due to the AC operating at its running power consumption. During the sixth measurement interval (x-axis label is 6), the aggregate consumption has increased to 5800 watts because a 1700-watt Microwave that has turned on (i.e. changing state from the OFF state to the ON state). During the seventh measurement interval (label D in the graph), the aggregate consumption has increased to 6100 watts. This increase of 300 watts is due to the change in state of a 300-watt Computer. During the ninth measurement interval, the aggregate consumption has dropped to 4400 watts. This decrease of 1700 watts in aggregate consumption is due to the change in state of the Microwave from the ON state into the OFF state. During the eleventh measurement interval, the aggregate consumption drops by another 300 watts. This decrease of 300 watts in aggregate consumption is due to the change in state of the Computer from the ON state to the OFF state. During the thirteenth measurement interval, the aggregate power consumption is measured to be 5800 watts. This increase of 1700 watts is due to the Microwave turning on again. It is the purpose of this invention to describe a method to determine the power consumption of individual appliances in a household by observing only periodic, aggregate power consumption measurements of the entire household.

FIG. 1 assumes that we already have a list of appliances in the household, and their power consumption profiles. We also assume that periodic measurements of the aggregate power consumption are available. As soon as we receive a new power measurement, we determine the change in aggregate power consumption. In a preferred embodiment, we measure aggregate consumption at one second interval. However, smaller or larger measurement intervals can also be used.

Measurement Interval:

Measuring aggregate consumption more frequently (i.e. at smaller measurement intervals like one-second) is desirable because the change in aggregate power consumption may most likely be due to a change in state of a single appliance. If a larger interval, say 5 seconds or so, is used, then there it is likely that two appliances may have changed their states. If an even larger measurement interval is used, it is likely that three appliances may have changed their state during the interval. In our experience, for household appliances, it is sufficient to measure aggregate power consumption every few seconds, and it is sufficient to analyze the possibility of at most three appliances changing state in any measurement interval. Depending on the household and the number of appliances in the household, the measurement interval can be adjusted so that we can uniquely attribute the change in aggregate consumption to one, two or three appliances.

Fast Utility Breakdown Method:

FIG. 1 describes a quick method to determine whether the change in aggregate consumption is due to a change in state of a single, pair or triplet of appliances. This method emphasizes speed over accuracy.

We first ascertain if the change in aggregate consumption can be due to the change of state of a single appliance (i.e., one appliance is either turning OFF or ON).

It is possible that there are multiple, candidate appliances (candidate singletons 140) that could equally account for the observed change in aggregate consumption. Any one of the candidate appliances could have caused the change in aggregate consumption. To break ties, we use additional information that is described later.

If the change in aggregate consumption cannot be accounted for by the change in status of a single appliance, then we consider whether two appliances may have changed their state. Again, it is possible that there are multiple candidate pairs 150 of appliances that could have equally caused the observed change in aggregate consumption, and we break ties between the candidate pairs by using additional information about use sequence of the appliances, duration and time of plausible use of these appliances. This is described later.

If the change in aggregate consumption is not due to a change in state of a pair of appliances, we consider whether three appliances could have changed their state during the measurement interval. Again, it is possible that multiple appliance triplets (candidate triplets 160) could equally account for the observed change, we attempt to break ties using additional information, as described earlier.

It is possible that the measurement interval is very large, and more than three appliances may have changed their state during a measurement interval. If this is the case, then we suggest one or both of the following: (a) the measurement interval can be reduced, or (b) the current meter be replaced with another measuring unit that can record aggregate consumption measurements in even smaller intervals (for example, sub-second intervals). In practice, it is quite easy to measure aggregate consumption, every second, by using cheap current sensors. Our experience with a prototype that uses a current meter that is capable of measuring aggregate consumption, every second, shows that more often than not, most of the observed changes in the aggregate consumption are due to a change in state of one or a pair of appliances, and very rarely, do we have to resort to analysis of a triplet of appliances.

Figure 2:
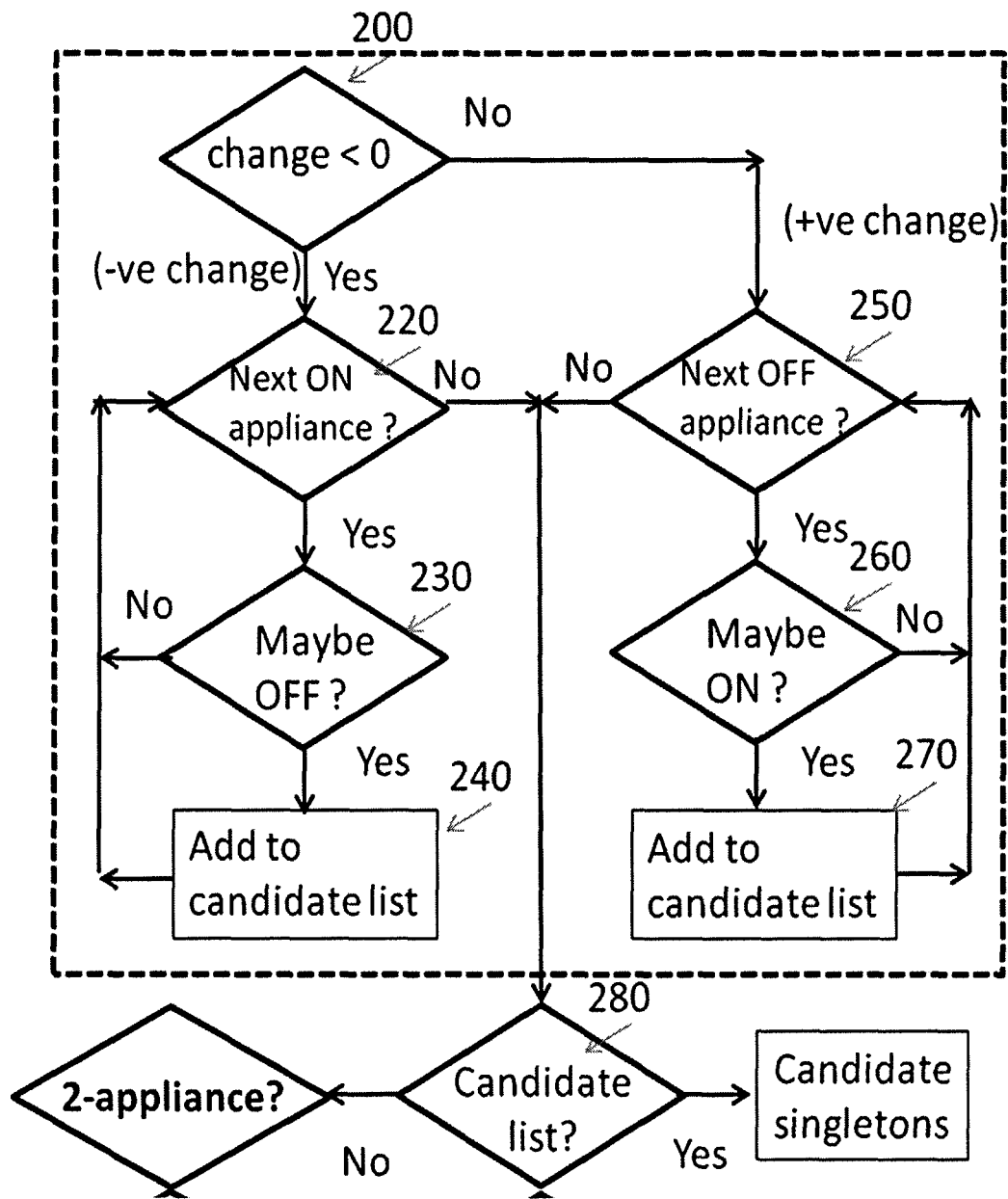
FIG. 2 shows the preferred embodiment of a process to determine whether observed change in aggregate power consumption during a measurement interval is due to a change in status of a single appliance.

1-Appliance Method:

FIG. 2 describes a method to determine whether a change in state of a single appliance can account for the observed change in aggregate consumption. We start with a specific value for the change in aggregate consumption. If this value is negative, then an appliance that is already turned on may have been turned off. We examine all appliances that are in the ON state, one at a time. From the power profile of an appliance, we know the power consumption of the appliance. If the drop in power consumption due to turning off the appliance (this information is available from the power profile of the appliance) is equal to the change in aggregate power consumption, then a change in state of this appliance can explain the observed change in aggregate consumption. Again, more than one appliance may be equally likely to individually account for the observed change in aggregate consumption, and a procedure to break ties is necessary. If the observed change in aggregate consumption is positive, then a new appliance has turned on. If the increase in power consumption due to turning on the appliance (power consumption information is available from the power profile of the appliance) is equal to the change in aggregate power consumption, then a change in state of this appliance can explain the observed change in aggregate consumption. Again, multiple appliances may be candidates (Candidate singletons in FIG. 1 or FIG. 2) to account for the observed change in aggregate consumption, and it may be necessary to break ties. In the event that we cannot explain the observed change in aggregate consumption as a change in state of a single appliance, we consider whether a pair of appliances may have changed their state within the measurement interval.

Figure 3:
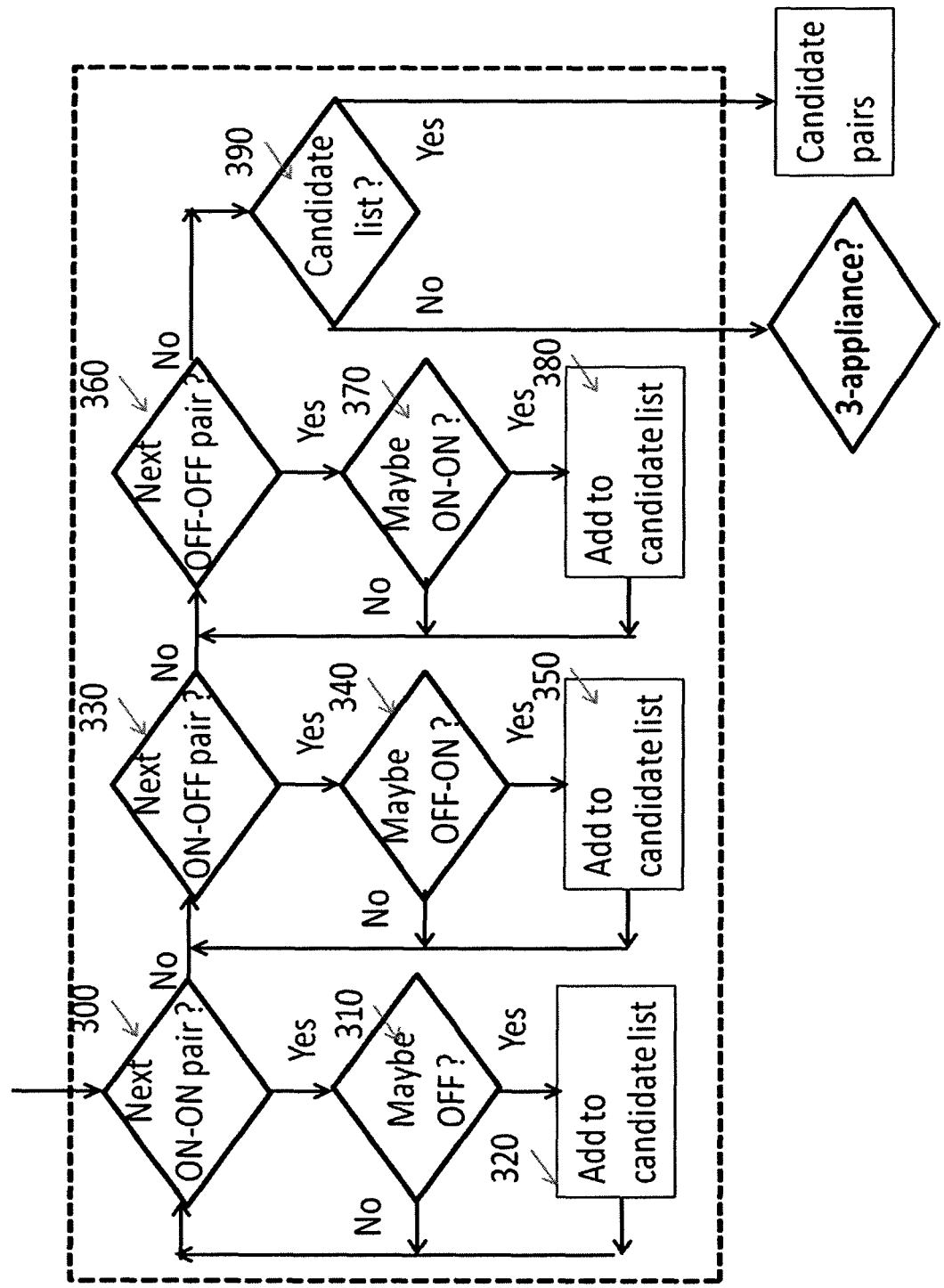
FIG. 3 shows the preferred embodiment of a process to determine whether the change in aggregate power consumption is due to a change in the status of a pair of appliances.

2-Appliance Method:

FIG. 3 shows the method to determine if a pair of appliances are responsible for the observed change in aggregate consumption. We first consider whether a pair of appliances, that are both in the ON state, could have changed their status to the OFF state. We keep a record of such pairs, and break ties later. We then explore the possibility of one of the appliances in the appliance pair has turned OFF, and the other appliance in the pair has turned ON. We keep a record of all such pairs, and break ties later. We then consider whether two new appliances, that are currently in the OFF state, have turned ON during the measurement interval. We keep a record of such pairs (Candidate Pairs in FIG. 1 or FIG. 2), and break ties as described later. We consider all the pairs of appliances that we have recorded as candidate pairs that can account for the observed change in aggregate consumption, and break ties using additional information, as described earlier. Finally, if an appliance pair cannot fully account for the observed change, we determine whether a combination of three appliances (appliance triplet) can account for the observed change in aggregate consumption.

Figure 4:
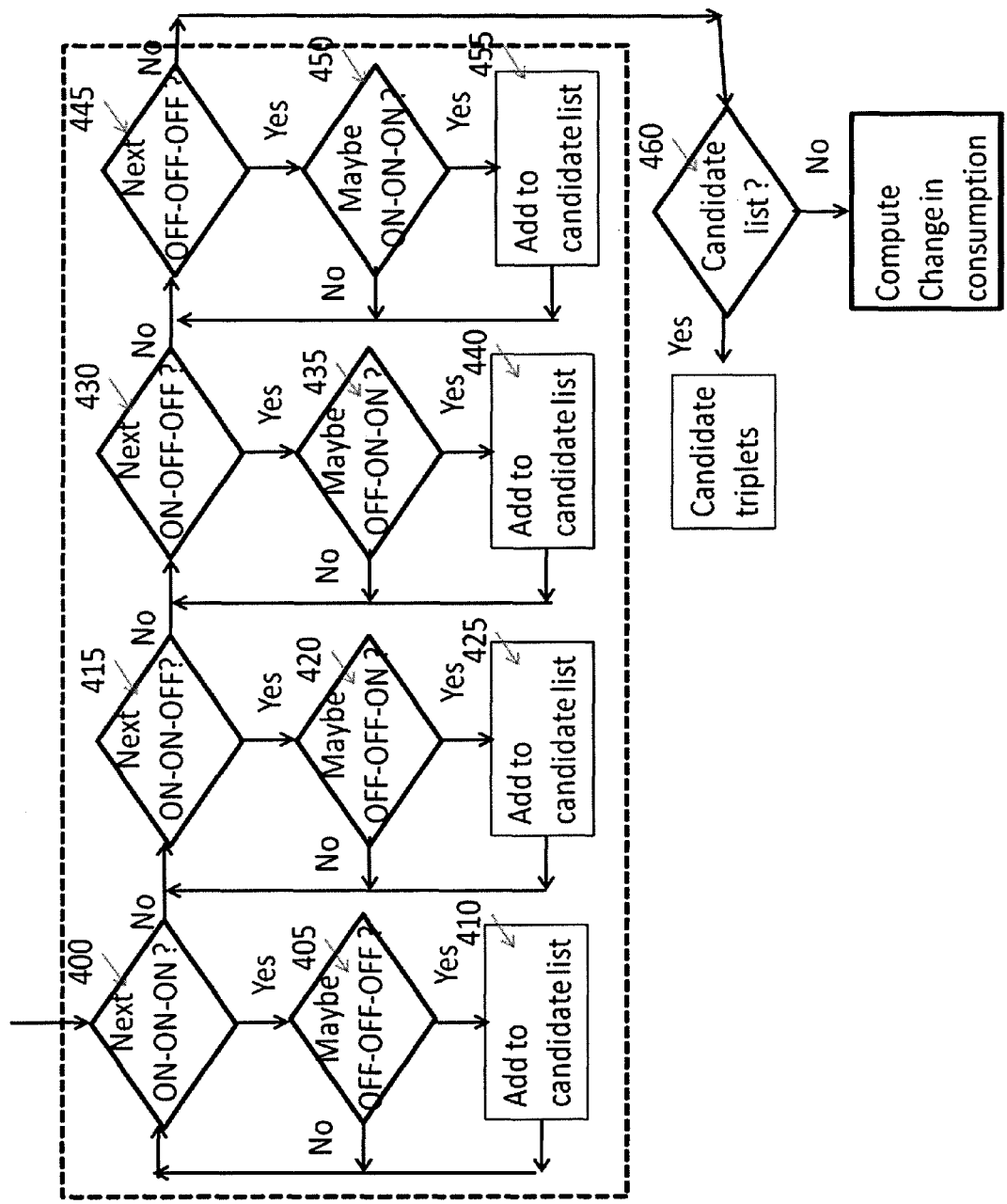
FIG. 4 shows the preferred embodiment of a process to determine whether the change in aggregate power consumption is due to a change in status of a triplet of appliances.

3-Appliance Method:

FIG. 4 describes a method to determine whether a change in the state of a triplet of appliances can account for the observed change in aggregate consumption. We first consider whether a triplet of appliances, that are all in the ON state, could have all changed their state to the OFF state. We keep a record of such pairs, and break ties later. We then explore whether a pair of appliances, that are in the ON state, may have changed their state to the OFF state, and a new appliance has turned on. If the change in power consumption due to the pair of appliances turning off, and the third appliance turning on, accounts for the observed change in aggregate consumption, then this triplet is a candidate triplet. We keep a record of all such candidate triplets, and break ties later. We then consider whether an appliance in the ON state may have turned off, and two other appliances may have turned on. Again, we keep a record of all such candidate triplets in "Candidate triplets" (FIG. 1 or FIG. 2), and break ties later. Finally, we only consider triplets of appliances that are currently in the OFF state, and examine if turning all of them can explain the observed change in the aggregate consumption. Again, we keep a record of all such candidate triplets. We consider all the pairs of appliances that we have recorded as candidate triplets that can account for the observed change in aggregate consumption, and break ties using additional information, as described later.

Figure 5:
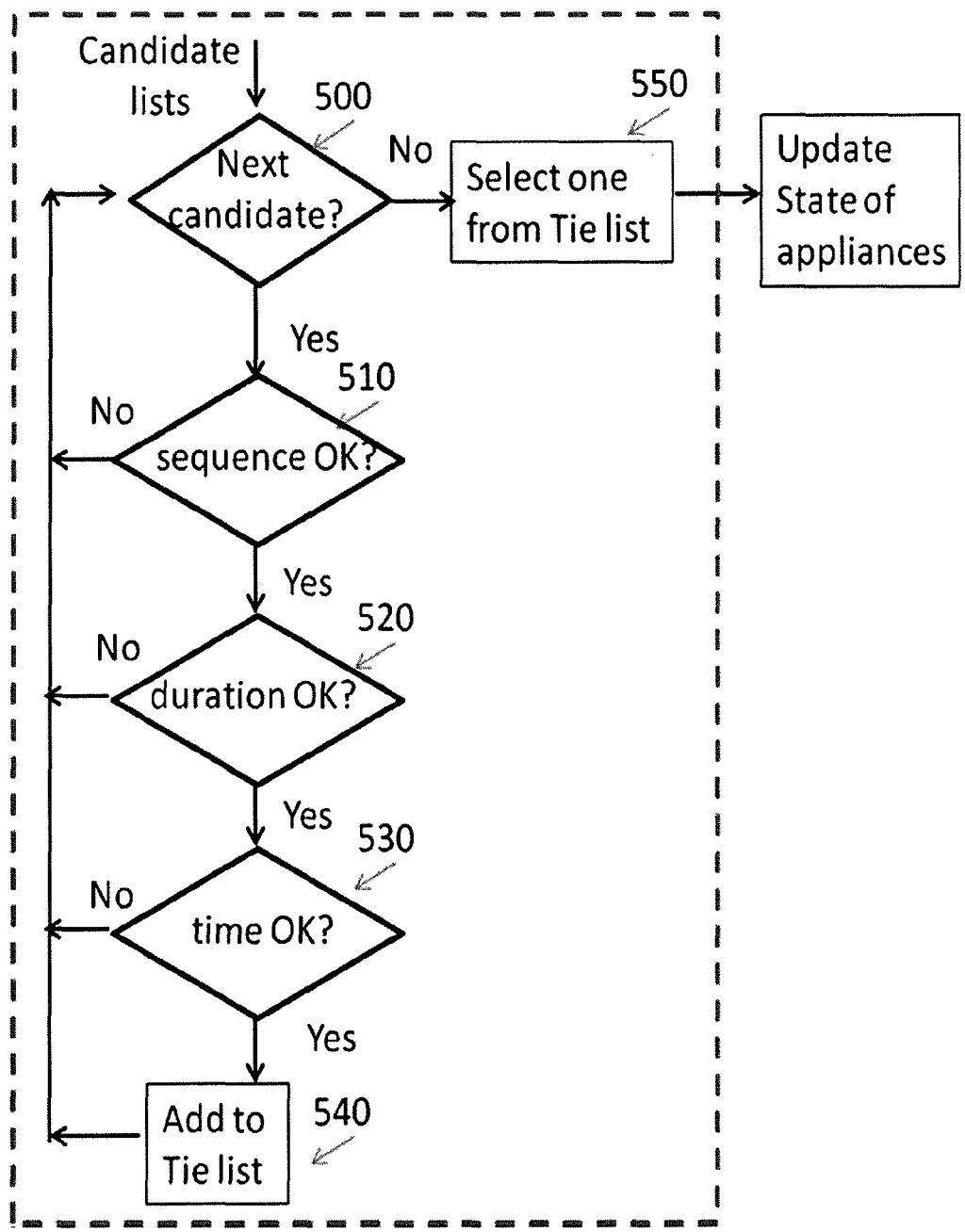
FIG. 5 shows the preferred embodiment of a process to break ties amongst several appliances that could have caused the observed change in aggregate power consumption in a measurement interval.

Tie-Breaking Method:

FIG. 5 describes a method to break ties. Information to break ties is either already available from the power consumption profile of the appliances, or it can be provided by the home owner. For example, the power consumption profile indicates if an appliance is a resistive or a reactive load. Before we can conclude that the observed change in aggregate consumption is due to the running power consumption of a reactive device, it must be the case that this appliance was turned on, and it must have consumed its starting power consumption, within the past two to five seconds. If this is not the case, then the running power consumption of this appliance cannot have caused the observed change in aggregate consumption. Therefore, the sequence of operation of a reactive device (starting power consumption must precede running power consumption, and loaded power consumption must follow running power consumption) is useful to break ties. Also, if change in aggregate consumption can be explained by an appliance turning off, then we must ensure that the appliance was on in previous measurement interval. Sequence checking is done in box 510 in FIG. 5. Some appliances have known ranges of duration of use 520. For example, it is unlikely that a microwave oven use case includes several hours of continuous operation. A bread toaster will probably be on only for a few minutes before it is turned off. Also, some appliances may be in operation only at certain times of the day, week, month or year 530. We use the information about sequence of use, duration of use and possible times of use to break ties. If this information is not sufficient to break all ties, we randomly select one candidate and update the state.

Figure 9:
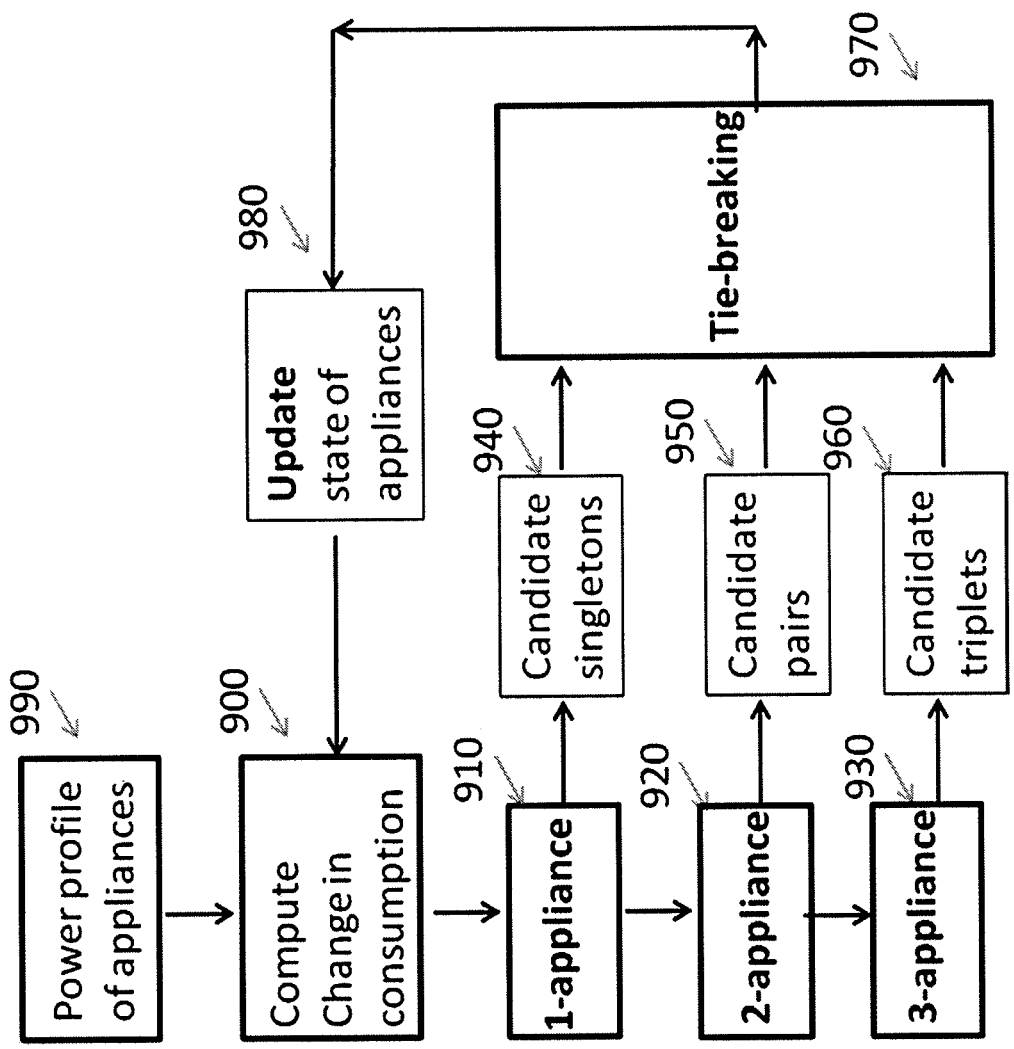
FIG. 9 shows an example of more accurate method to determine breakdown of consumption.

Slower, but More Accurate Utility Breakdown Method:

FIG. 9 describes another method to determine whether the change in aggregate consumption is due to a change in state of a single, pair or triplet of appliances. This method emphasizes accuracy over speed. In this method, we consider all three possibilities: one appliance, two appliances and three appliances. We compute candidate singletons using the method discussed in FIG. 2. We compute candidate pairs using the method discussed in FIG. 3. We compute the candidate triplets using the method discussed in FIG. 4. The method to break ties is the same as in FIG. 1. In practice, the method of FIG. 1 is sufficient but if the utility measurement unit is only capable of periodic measurements at large intervals, then the method in FIG. 9 is useful. This is because the likelihood of two or three appliances changing state is higher, and the method of FIG. 9 offers higher accuracy.

Having described preferred embodiments of a system and method for determining the utility consumption of each appliance in a collection of appliances by using periodic measurements of aggregate consumption of all appliances (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

TABLE 1

POWER CONSUMPTION OF HOUSEHOLD DEVICES

| APPLIANCES | RESISTIVE LOAD | REACTIVE LOAD |
|---|---|---|
| BLENDER | 375 WATTS | 500 WATTS |
| CLOCK RADIO | 5 WATTS | — |
| COFFEE MAKER | 1,700 WATTS | — |
| COMPUTER-PC | 300 WATTS | — |
| HAIR DRYER | 1,875 WATTS | — |
| IRON | 1,200 WATTS | — |
| MICROWAVE | 1,050-2,500 WATTS | — |
| WASHING MACHINE | 1,150 WATTS | 2,200 WATTS |
| WATER HEATER | 4,000 WATTS | — |

TABLE 1-continued

POWER CONSUMPTION OF HOUSEHOLD DEVICES

| APPLIANCES | RESISTIVE LOAD | REACTIVE LOAD |
|---|---|---|
| TV-COLOR | 300 WATTS | — |
| AIR COMPRESSOR (1 HP) | 1,500 WATTS | 4,500 WATTS |
| FREEZER | 800 WATTS | 2,100 WATTS |
| FURNACE FAN | 875-1,200 WATTS | 2,200 WATTS |
| GARAGE DOOR OPENER | 550 WATTS | 1,000 WATTS |
| GRINDER, BENCH | 1,400 WATTS | 2,450 WATTS |
| FREEZER | 800 WATTS | 2,100 WATTS |
| SUMP PUMP (⅓ HP) | 800 WATTS | 1,250 WATTS |
| WELL PUMP (½ HP) | 150 WATTS | 1,950 WATTS |

TABLE 2

EXAMPLE OF POWER MODES OF APPLIANCES

| APPLIANCE | MODES | POWER |
|---|---|---|
| TV | Typical viewing | 50 W |
|  | Standby | 3 W |
| WASHING MACHINE | Water pump only | 15 W |
|  | Heat water | 2300 W |
|  | Rotate drum | 250 W |
|  | Heat water and rotate drum | 2550 W |

What is claimed is:

1. A method for determining utility consumption of each appliance from a collection of appliances by measuring only aggregate utility consumption of the collection of appliances, the method comprising of:
   (a) determining utility consumption of various modes of each appliance,
   (b) determining a periodic measurement interval, and measuring the aggregate utility consumption at the periodic interval,
   (c) first determining if a change in aggregate utility consumption in an interval is due to change in status (ON or OFF) of one of the collection of appliances, otherwise
   (d) then determining if the change in aggregate consumption is due to a change in state of a pair of appliances, otherwise
   (e) then determining if change in aggregate consumption is due to change in state of a triplet of appliances, and
   (f) determining total utility consumption of a specific appliance from the collection of appliances from the utility consumption of the specific appliance in each measurement interval.

2. The method of claim 1, where determining if the change in aggregate utility consumption in a measurement interval is due to change in state of one of the appliances, further consists of:
   (g) determining if the aggregate consumption has increased (positive) or decreased (negative),
   (h) if aggregate consumption has decreased, then first determining if it is due to change of state of an appliance that is already ON, otherwise
   (i) if the aggregate consumption has increased, then determining if it is due to change in state of an appliance that is currently OFF.

3. The method of claim 1, where determining if the change in aggregate utility consumption in a measurement interval is due to change in state of a pair of appliances, further consists of:
   (j) determining if the aggregate consumption in a measurement interval is due to change in state of a pair of appliances that are both already in the ON state, otherwise,
   (k) then determining if the aggregate consumption is due to change in state of a pair of appliances where one appliance is already in ON state and the other appliance is in the OFF state, otherwise
   (l) then determining if the aggregate consumption is due to change in state of a pair of appliances that are both in the OFF state.

4. The method of claim 1, where determining if the change in aggregate utility consumption in an interval is due to change in status of a triplet of appliances, further consists of:
   (m) determining if the change in aggregate consumption is due to change in state of a triplet of appliances that are all in the ON state, otherwise
   (n) then determining if the change in aggregate consumption is due to change in state of a triplet of appliances where two of the said appliances are in the ON state and one is in the OFF state, otherwise
   (o) then determining if the change in aggregate consumption is due to change in state of a triplet of appliances where one of the said appliance is in the ON state, and the remaining two of the said appliances are in the OFF state, otherwise
   (p) then determining if the change in aggregate consumption is due to change in the state of a triplet of appliances where all three of the said appliances are in the OFF state.

5. The method of claim 2, where change in aggregate consumption is due to the change in state of any one appliance in a group consisting of appliances where any member of the group could have caused the change in aggregate consumption, then ties are broken to select one appliance that is designated to be the cause of the change in aggregate consumption.

6. The method of claim 3, where change in aggregate consumption is due to the change in state of any one pair of appliances in a group consisting of pairs of appliances where any member of the group could have caused the change in aggregate consumption, then ties are broken to select one appliance pair that is designated to be the cause of the change in aggregate consumption.

7. The method of claim 4, where change in aggregate consumption is due to the change in state of any one triplet of appliances in a group consisting of triplets of appliances where any member of the said group could have caused the change in aggregate consumption, then ties are broken to select one triplet of appliances that is designated to be the cause of the change in aggregate consumption.

8. The method of claim 5, where ties are broken by considering additional information about the appliance like suggested durations of use, times of use, and sequence of use of the appliance.

9. The method of claim 6, where ties are broken by considering additional information about the appliance or appliance pair like suggested durations of use, times of use, and sequence of use of the appliance or appliance pair.

10. The method of claim 7, where ties are broken by considering additional information about the appliance or appliance pair or appliance triplet like suggested durations of use, times of use, and sequence of use of the appliance or appliance pair or appliance triplet.

11. The method of claim 8, where ties are broken by first considering the sequence of use of an appliance, then considering the duration of use, and then considering the time of use.

12. The method of claim 9, where ties are broken by first considering the sequence of use of an appliance in the appliance pair or the sequence of use of appliances in the pair, then considering the duration of use of said appliance or appliance pair, and then considering the time of use of said appliance or appliance pair.

13. The method of claim 10, where ties are broken by first considering the sequence of use of an appliance or appliance pair in the appliance triplet or the sequence of use of appliances in the appliance triplet, then considering the duration of use of said appliance or appliance pair or appliance triplet, and then considering the time of use of said appliance or appliance pair or appliance triplet.

14. A method for determining utility consumption of each appliance from a collection of appliances by measuring only aggregate utility consumption of the collection of appliances, the method comprising of:
   (a) determining utility consumption of various modes of each appliance,
   (b) determining a periodic measurement interval, and measuring aggregate utility consumption at the said periodic measurement interval,
   (c) determining if the change in aggregate utility consumption in an interval is due to change in status (ON or OFF) of one of the collection of appliances,
   (d)-determining if the change in aggregate consumption is due to a change in status of a pair of appliances,
   (e)-determining if change in aggregate consumption is due to change in status of a triplet of appliances, and
   (f) breaking ties, if necessary among candidate singletons, candidate pairs and candidate triplets, and
   (g) determining total utility consumption of a specific appliance from the collection of appliances from the utility consumption of the specific appliance in each measurement interval.

15. A system that determines utility consumption of each appliance in a collection of appliances by measuring only the aggregate utility consumption of the collection of appliances, comprising:

a measuring unit to measure aggregate utility consumption at periodic measurement intervals,
   1-appliance solver for first determining if the change in aggregate utility consumption in an interval is due to change in status (ON or OFF) of one of the collection of appliances,
   2-appliance solver for determining if the change in aggregate utility consumption is due to a change in status of a pair of appliances,
   3-appliance solver for determining if change in aggregate utility consumption is due to change in status of a triplet of appliances, and
   an analytics unit for calculating total utility consumption of a specific appliance from the utility consumption of the specific appliance in each measurement interval.

16. A computer program product including a non-transitory computer readable medium with instructions, said instructions enabling a computer to determine utility consumption of each appliance in a collection of appliances by using measurements of aggregate utility consumption, said instructions comprising:
   instructions for a measuring unit to receive utility consumption at periodic intervals,
   instructions for a 1-appliance solver for first determining if the change in aggregate utility consumption in an interval is due to change in status (ON or OFF) of one of the appliances,
   instructions for a 2-appliance solver for determining if the change in aggregate consumption is due to a change in status of a pair of appliances,
   instructions for a 3-appliance solver for determining if change in aggregate consumption is due to change in status of a triplet of appliances, and
   instructions for an analytics unit for calculating total utility consumption of an appliance from the utility consumption of the said appliance in each measurement interval.

* * * * *